United States Patent Office 2,973,913
Patented Mar. 7, 1961

2,973,913

MECHANISM FOR DRIVING A SPOOL OF A CINEMATOGRAPHIC PROJECTOR

Jean Thevenaz, Grandson, Switzerland, assignor to Paillard S.A., Vaud, Switzerland, a corporation of Switzerland Filed Aug. 14, 1957, Ser. No. 678,194

Claims priority, application Switzerland Sept. 28, 1956

3 Claims. (Cl. 242—55.14)

The present invention has for its subject a driving mechanism of a spool of a cinematograph projector, comprising two horizontal shafts, the driving shaft and the driven shaft carrying the spool, secured in rotation respectively with the driving part and the driven part of a variable friction coupling device in proportion to the weight of the spool.

As is well known, one of the problems which occurs in the construction of cinematographic projectors is that of driving the spools in such a manner that the linear speed of the film remains constant; this is generally obtained by the use of friction coupling devices. However, in view of the considerable difference between the internal and external diameter of a spool, as also the fragility of the film, it is not possible to effect the driving of the spool at a constant couple, but this drive should be effected with a variable couple, enabling the tension of the film to be rendered practically constant independent of the winding diameter. Various mechanisms have been conceived for solving this problem, the majority using a friction coupling device variable in proportion to the weight of the spool. However, all these known mechanisms have the disadvantage which consists in the appearance of non-parallelism of the shafts connected by the coupling device, as a result of the automatic elimination of the clearance which becomes apparent between the frictional surfaces by reason of the wear thereof. It wil be obvious that this non-parallelism of the shafts produces overlapping of the spool and consequently a defective feed of the film and its deterioration.

The mechanism according to the invention has for its object to eliminate the above-mentioned disadvantage and is distinguished from known mechanisms by the fact that each of the parts, driving and driven, of the coupling device comprise a plane frictional surface, perpendicular to the shaft by which it is carried, said surfaces in contact one with the other ensuring parallelism of the two shafts, each of the said parts, driving and driven, also comprising a second friction surface formed by a surface of revolution of which the generatrix forms an angle with the corresponding shaft, said surfaces of revolution cooperating amongst one another according to the principle of the inclined plane, in such a manner as to eliminate any clearance due to wear of the friction surfaces, whilst maintaining parallelism of the shafts.

Two forms of construction of the mechanism according to the invention are shown diagrammatically and by way of example in the accompanying drawings, wherein.

Figure 1:
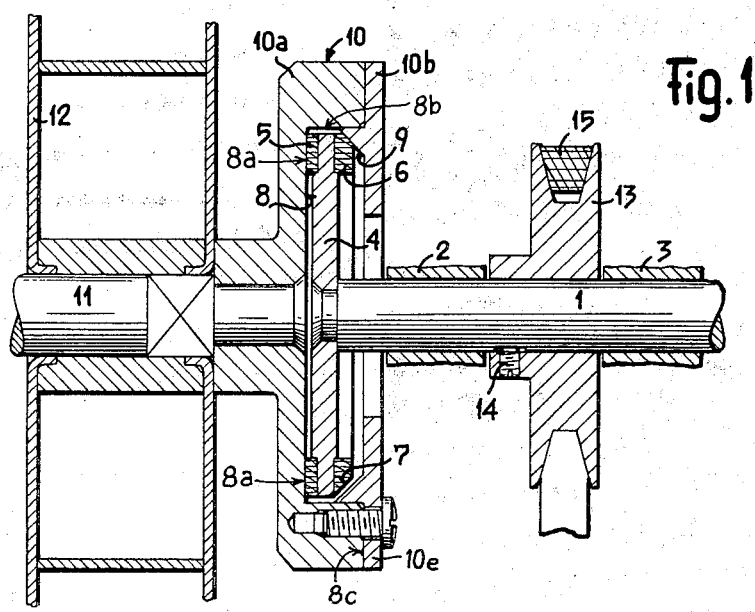
Fig. 1 is a view, partially in section, showing the driving mechanism for the receiving spool of a projector.

In the form of construction shown in Fig. 1, the mechanism comprises a driving shaft 1 carried by two bearings 2 and 3 provided in the framework, not shown, of a cinematographic projector. At one of its ends, the shaft 1 carries a disc 4 provided on each of its faces, in proximity to the edge, with a fibre lining 5 and 6. The lining 6 has a surface of revolution 7 of which the generating line forms an angle with the geometrical axis of the shaft 1. The linings 5 and 6 are in contact respectively with a flat inner side wall 8 having a friction surface $8^a$ and a surface of revolution 9 in the interior of a drum 10 formed by a bell-shaped member $10^a$, including a flat inner side wall 8 and its friction face $8^a$, and a cylindrical side wall $8^b$ disposed at right angles to said wall to provide an exposed outer attaching edge $8^c$. The cavity formed by the side wall 8, cylindrical wall $8^b$, receives the disc 4 having the friction linings 5 and 6 mounted at opposite sides of said disc. The cover C has a flange portion $10^b$ overlying the attaching edge $8^c$ to which it is attached by screws, as shown.

The inner face of the cover C is provided with a surface of revolution 9 disposed obliquely to the axes of shafts 1 and 11.

From the foregoing, it will be understood that one flat face of the rectangular friction member 5 is at the side of the disc 4 nearest the axis of the driven shaft carrying the spool, while the truncated surface 7 of the lining 6 is nearer the driving shaft. Moreover, the diameter of the mating surfaces 7 and 9 decrease in diameter toward the axes of the shafts 1 and 11. In other words, the diameter of the mating truncated surfaces 7 and 9 lessen going away from the spool. Said drum 10 is secured to one of the ends of a shaft 11, the other end thereof carrying a spool 12. Thus the driving shafts 1 and the driven shaft 11, located end to end, are connected together by a friction clutch of which the disc 4 constitutes the driving part and the drum 10 the driven part. As will be seen, the assembly constituted by the drum 10, the shaft 11 and the spool 12 is carried by the disc 4 and, consequently, by the driving shaft 1. A grooved pulley 13 is secured to the shaft 1 by means of a screw 14, enabling it to be driven in rotation by a motor, not shown, by means of a belt 15.

The mechanism described above operates in the following manner:

The spool 12, by reason of its weight, causes, according to the principle of the inclined plane, the surface 9 of the drum 10 to slide on the surface 7 of the lining 6, until the face 8 of the drum is pressed against the face of the lining 5, these two faces being plane and perpendicular to the shaft 11 and to the shaft 1 respectively.

Consequently the pressure applied by the drum 10 to the linings 5 and 6 of the first disc 4 is a function of the weight of the spool 12. Thus the drum 10 of the disc 4 constitutes a coupling device of variable friction, between the shafts 1 and 11. When the shaft 1 is driven in rotation, by means of the pulley 13, the couple transmitted by the disc 4, that is to say the driving part of the coupling, to the drum 10, thus to the driven part, for effecting the driving of the shaft 11, will depend on the weight of the spool 12 and will be proportional to this.

On the other hand, the clearance resulting from wear of the linings 5 and 6 is eliminated automatically by the action of the weight of the spool. However, by reason of the existence of the surfaces of revolution 7 and 9, the elimination of the clearance is not effected to the detriment of parallelism of the shafts 1 and 11, which parallelism is always maintained through the medium of the surfaces 5 and 8 which are applied continuously one against the other by reason of the axial component resulting from contact of the two surfaces of revolution 7 and 9.

Figure 2:
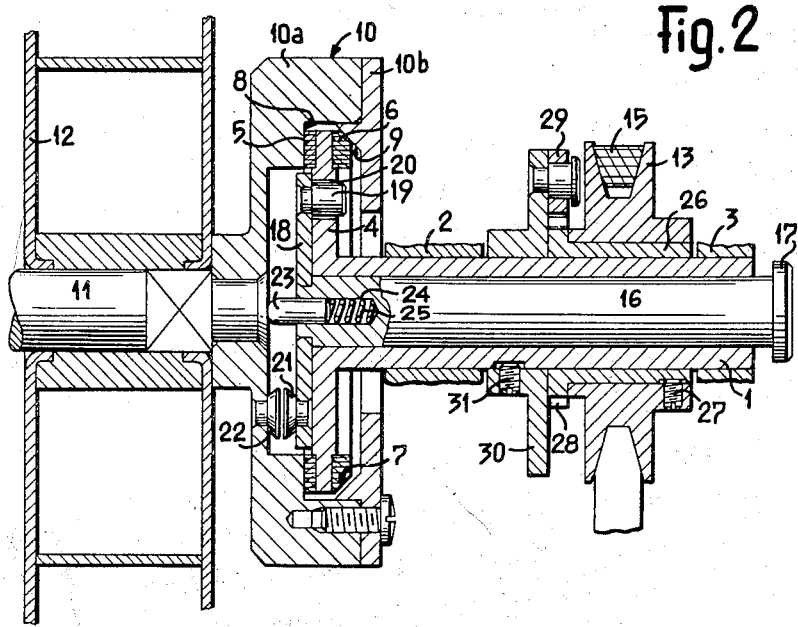
Fig. 2 is a view, partially in section, showing the driving mechanism of the feed spool of a projector, for rearward movement or for rewinding.

The mechanism according to the form of construction shown in Fig. 2 is adapted to drive the feed spool of a projector, during rearward movement or rewinding. In this form of construction, the driving shaft 1 is a hollow shaft through which passes a piston 16. The latter comprises at one of its ends a knob 17, at its other or second disc 18 rendered angularly solid with the disc 4, by means of a plug 19 riveted in the disc 18 and engaged in an opening 20 of the disc 4. The disc 18 also carries, on the face thereof opposite the disc 4, a claw 21 adapted to cooperate with a similar claw 22 secured to the inner face of the drum 10 to provide means for releasably connecting the driven and driving shafts together during rewinding. A push rod 23, located in a recess 24 of the piston 16, bears against the end of the shaft 11, under the action of a spring 25, and tends to maintain the piston 16 in the position shown in Fig. 2. The pulley 13 is not secured to the shaft 1, but to a sleeve 26 to which it is secured by means of screws 27. The sleeve 26 is mounted loosely on the shaft 1 and carries, at one of its ends, a ratchet wheel 28 adapted to cooperate with a pawl 29 carried by a wheel 30 secured to the shaft 1 by screws 31.

The operation of the mechanism described above is as follows:

During normal operation of the projection (forward movement), the pulley 13 is driven in the direction for which the ratchet mechanism formed by the wheel 28 and the pawl 29 is inactive, so that the sleeve 26 turns freely on the shaft 1 without driving it. The spool 12, operating as a feed spool, is driven by the driving mechanism of the film during the unwinding of the latter. On the contrary, when the rearward movement of the projector is controlled, the pulley 13 is driven in the direction so that the pawl mechanism 28, 29 becomes active, so that the shaft 1 is also driven in rotation and, through the medium of the friction clutch above described, the shaft 11 and the spool 12, which becomes the receiving spool.

Finally, for rewinding the film on the delivery spool, it is of advantage to be able to drive the shaft 11 at the same speed as the driving shaft 1, in order to obtain a maximum speed of rewinding. The mechanism according to the invention permits of rendering inoperative the friction coupling device and replacing it by a claw coupling device in the following manner:

After having set the projector for rearward movement, pressure is applied on the knob 17 of the piston 16, which causes the latter to slide, against the action of the spring 25, in the direction of the shaft 11. The disc 18, being secured to the piston 16, is subjected to the same movement, enabling the claw 21 to come into engagement with the claw 22 and to move it therewith, and consequently also the drum 10, the shaft 11 and the spool 12, at the speed of the shaft 1. When the claw 21 is opposite the claw 22, as shown in the drawing, the difference in speeds of rotation enables the claw 21 to slide on the claw 22, after which the complete movement of the piston 16 becomes possible. The coupling of the claws having been established, the knob 17 may be released. When, at the end of rewinding, the mechanism is stopped, the rotation of the spool still continues, by reason of its inertia, thus producing a spacing of the claws and enabling the spring 25 to return the piston 16 to the normal position.

It will be understood that in a modification, both in the first and in the second form of construction, the disc 4 and the drum 10 may be reversed. In fact, the disc 4 may be secured to the shaft 11 and the drum 10 to the shaft 1, without modifying the principle of operation. In this case, the weight of the spool 12 on the shaft 11 and on the disc 4, causes the surface 7 of the latter to slide on the surface 9 of the drum 10, until the face of the lining 5 is applied against the face 8 of the drum 10. Consequently the surfaces 7 and 9 are in contact on the lower portion of the forms of the device shown in the drawing figures and spaced one from the other on the upper part.

I claim:

1. A driving mechanism for effecting rotational movement of a film spool, comprising, a driven shaft, a film spool mounted on said driven shaft, a hollow driving shaft, a sleeve free to rotate on said driving shaft and having a ratchet ring, a pulley keyed to said sleeve, a ratchet wheel keyed to rotate with said driving shaft and having a pawl for engaging said ratchet ring to drive said ring in one direction; and friction coupling means connecting said shafts, said coupling means including a housing having spaced internal frictional surfaces respectively disposed perpendicular to and at right angles to said shafts, a first disc on the hollow shaft and having a frictional surface on one side perpendicular to the axis of the shaft for engagement with said perpendicular face on the housing, and also having on the other side another frictional surface disposed at substantially right angles to said axis for engagement with said right angularly disposed surface of the housing, a piston in said hollow shaft, a second disc on the piston and interlocked with the first disc against angular movement but slidable relative to the hollow shaft upon movement of the piston, cooperating claw means on the facing portions of the housing and the second disc, and spring means confined between the driven shaft and the piston normally to maintain the claw means disengaged except when the piston is pushed inwardly against the force of said spring means toward said spool.

2. A driving mechanism for effecting rotational movement of a film spool, comprising, a driven shaft, a film spool mounted on said driven shaft, a hollow driving shaft, a sleeve having a driving pulley and free to rotate on said driving shaft, co-operating means on the sleeve and shaft to drive said hollow shaft in one direction, friction coupling means connecting said shafts, including coupling means including a housing having internal frictional surfaces, a first disc on the hollow shaft and having frictional surfaces engaging with said frictional faces on the housing, a piston in said hollow shaft, a second disc on the piston and interlocked with the first disc against angular movement but slidable relative to the hollow shaft upon movement of the piston, clutch means on the facing portions of the housing and the second disc rendered effective when the piston is pushed in the direction of the spool, and spring means normally to maintain the clutch means disengaged.

3. A driving mechanism for imparting rotary motion to a film spool full or partially full of film and maintaining substantially constant tension upon the film, including, a driven shaft, a spool mounted upon said driven shaft, a drive shaft aligned with said driven shaft, and friction type coupling means connecting said shafts, said coupling means comprising, a drum in the form of a bell-shaped member carried by one of said shafts and including a flat inner side wall having a friction face and a cylindrical inner side wall joining an exposed outer attaching edge at right angles to said wall, said friction face being perpendicular to the axes of said shafts, an annular cover having a peripheral flange portion attached to the exposed outer edge of the cylindrical side wall of said drum, the inner side of said cover having an internal truncated friction surface, a disc mounted within the drum, a first annular friction lining at one side of the disc and having its exposed face cooperating with said friction face, said disc also having on its other side a second annular friction member whose exposed truncated face cooperates with said truncated friction surface of the cover, the friction surface of said first annular lining facing said side wall of the bell-shaped member being nearer the axis of the driven shaft than the face of said second friction member, and the greater diameter of the truncated surface of the second annular friction member being nearest the driven shaft, the said truncated surfaces decreasing in diameter toward the axes of said shafts.

References Cited in the file of this patent

UNITED STATES PATENTS 2,127,768    Debrie    Aug. 23, 1938
2,545,960    Kuehn    Mar. 20, 1951